(12) United States Patent
Devi Reddy et al.

(10) Patent No.: US 10,389,742 B2
(45) Date of Patent: *Aug. 20, 2019

(54) SECURITY FEATURE EXTRACTION FOR A NETWORK

(71) Applicant: VMware, Inc., Palo Alto, CA (US)

(72) Inventors: Ravi Kumar Devi Reddy, San Mateo, CA (US); Srinivas Rao Doddi, Fremont, CA (US); Mahendra Kumar Kutare, San Francisco, CA (US); Christophe Briguet, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/331,650

(22) Filed: Oct. 21, 2016

(65) Prior Publication Data

US 2017/0118236 A1    Apr. 27, 2017

Related U.S. Application Data

(60) Provisional application No. 62/244,667, filed on Oct. 21, 2015.

(51) Int. Cl.
*H04L 29/06* (2006.01)
*G06N 20/00* (2019.01)
(Continued)

(52) U.S. Cl.
CPC ........ *H04L 63/1425* (2013.01); *G06F 16/904* (2019.01); *G06F 16/9024* (2019.01);
(Continued)

(58) Field of Classification Search
CPC .................. H04L 63/1425; H04L 63/1441
See application file for complete search history.

(56) References Cited

U.S. PATENT DOCUMENTS

2015/0135317 A1* 5/2015 Tock ................. G06F 21/56
726/23
2015/0278729 A1* 10/2015 Hu ................. G06Q 10/0635
705/7.28
(Continued)

OTHER PUBLICATIONS

"Remedy 9: Fast Track Mobile Workforces—Boost Productivity Up to 75%,", BMC Software, Inc., 2005-2007, 5 pages, [Online] [Retrieved on Jan. 11, 2017] Retrieved from the Internet<URL:http://www.bmc.com/it-solutions/remedy-itsm.html>.

(Continued)

*Primary Examiner* — Harunur Rashid
(74) *Attorney, Agent, or Firm* — Fish & Richardson P.C.

(57) ABSTRACT

Disclosed is a system for detecting security threats in a local network. A security analytics system collects data about entities in the local network. The security analytics system parses the raw data into data fields. The security analytics system identifies a subset of the data fields based on the relevance of the data fields to detecting security threats in the local network. The security analytics system generates filtered data containing the subset of data fields and generates structured data based on the filtered data. The security analytics system identifies relationships between the plurality of entities, generates a set of features based on the structured data and the identified relationships, and generates one or more threat scores based on the set of features. The security analytics system detects malicious behavior performed by an entity in the local network based on the generated threat scores.

24 Claims, 11 Drawing Sheets

(51) Int. Cl.
*G06F 16/901* (2019.01)
*G06N 7/00* (2006.01)
*G06F 16/904* (2019.01)

(52) U.S. Cl.
CPC ............ *G06N 7/005* (2013.01); *G06N 20/00* (2019.01); *H04L 63/1433* (2013.01); *H04L 63/1441* (2013.01)

(56) References Cited

U.S. PATENT DOCUMENTS

| | | | | |
|---|---|---|---|---|
| 2015/0339477 A1* | 11/2015 | Abrams | ............... | G06F 21/554 726/23 |
| 2016/0180078 A1* | 6/2016 | Chhabra | ............... | G06F 21/31 726/19 |
| 2017/0017708 A1* | 1/2017 | Fuchs | ............... | G06F 17/30604 |
| 2018/0367551 A1* | 12/2018 | Muddu | ............... | G06N 99/005 |

OTHER PUBLICATIONS

"Request Tracker," Best Practical Solutions, LLC, 2002-2016, 4 pages, [Online] [Retrieved on Jan. 11, 2017] Retrieved from the Internet<URL:https://www.bestpractical.com/rt/>.

"From Beginning to Endpoint," Guidance Software, 1997-present, 5 pages, [Online] [Retrieved on Jan. 11, 2017] Retrieved from the Internet<https://www.guidancesoftware.com/.

"Google / GRR," GitHub, Inc., 2017, 3 pages, [Online] [Retrieved on Jan. 11, 2017] Retrieved from the Internet<https://code.google.com/p/grr/>.

\* cited by examiner

SECURITY FEATURE EXTRACTION FOR A NETWORK

CROSS REFERENCE TO RELATED APPLICATION

This application claims the benefit of U.S. Provisional Application No. 62/244,667, filed Oct. 21, 2015, which is incorporated by reference in its entirety.

BACKGROUND

Field of Art

The disclosure generally relates to the field of network security and more specifically to the detection of security threats within a network.

Description of Art

Maintaining the security of computer networks has become increasingly important as computer networks are being used for more purposes. Many homes are equipped with a home computer network to allow the people living there to connect to the Internet, and many of organizations, such as corporations, universities, and governments, use larger, internal computer networks to allow the devices within those organizations to communicate with each other and outside of the network. Devices on these networks often store and communicate sensitive information, such as people's private personal and financial information, or strategic or financial documents of the organization. Therefore, maintaining the security of this information is, therefore, critical to the users of the computer networks.

However, modern computer network security threats have become much more sophisticated and are adapting at a rapid pace, and conventional security measures are not well equipped to deal with these new threats. Conventional security measures are typically deployed at the perimeter of the network (e.g. a firewall) with the purpose of preventing security threats from entering the network in the first place. However, these measures are frequently ineffective at addressing security threats that have already entered the computer network, which could occur if, for example, an inexperienced user creates an opening in the security of the computer network. Therefore, security measures that simply prevent the entrance of security threats into a computer network are insufficient for protecting modern computer networks.

SUMMARY

Described herein is a method comprising: receiving, at a security analytics system, raw data describing a plurality of entities within a local network, the plurality of entities comprising at least one user and at least one device; identifying each entity of the plurality of entities based on the raw data; determining, for each entity of the plurality of entities in the local network, a set of entity properties based on the received raw data, the raw data comprising data logged by devices in the local network; determining entity relationships between the plurality of entities in the local network based on the identified properties, each entity relationship of the determined entity relationships comprising a timeframe during which the relationship existed; generating an entity graph describing the entity relationships, wherein nodes of the entity graph represent one or more of the plurality of entities, and edges in the graph represent relationships between the entities, each edge associated with the respective timeframe of the relationship; and providing, to a user of the local network, a user interface describing the entity graph, wherein the user interface describes the relationships described by the entity graph.

Also described herein is a method comprising: receiving, at a security analytics system, raw data describing a plurality of entities within a local network, the raw data comprising at least system log data and network traffic data, the plurality of entities comprising at least one user and at least one device in the local network; parsing the raw data into a plurality of data fields, each data field comprising a type and a value; identifying a subset of the plurality of data fields based on the relevance of the plurality of data fields for detecting a security threat in the local network; generating filtered data from the raw data, the filtered data comprising the subset of the plurality of data fields; generating structured data from the filtered data, the structured data being divided into portions that are each structured in accordance with a schema in a set of schema, each schema describing at least one data field of the subset of data fields from the filtered data; identifying relationships between the plurality of entities in the local network based on the structured data; generating a set of features of the raw data based on the set of structured data and the identified relationships; generating one or more threat scores based on the set of features and the identified relationships; detecting malicious behavior exhibited by an entity of the plurality of entities based on the one or more threat scores; and providing an indication of the detected entity to a user of the security analytics system.

Also described herein is a method comprising: accessing a set of structured data describing a plurality of entities within a local network, the structured data being divided into portions that are each structured in accordance with a schema in a set of schema, each schema describing similar fields of data; generating a set of features from the structured data, the set of features describing aspects of the structured data and aspects of the plurality of entities; accessing an entity graph describing relationships between the plurality of entities based on the set of structured data, wherein nodes of the entity graph represent the plurality of entities and edges of the entity graph represent relationships between the plurality of entities; generating machine-learned models of the plurality of entities based on the set of structured data and the entity graph, wherein the machine-learned models are models of behaviors of the plurality of entities for detecting security threats in the local network; generating a plurality of threat scores by applying the machine-learned models and to the structured data and the generated graph, each threat score of the plurality of threat scores representing the likelihood that a security threat is present in the local network; determining whether a security threat is present in the local network based on the plurality of threat scores; and responsive to determining that a security threat is present in the local network, providing an indication of a security threat to a user of the security analytics system.

Additionally, a computer program product and a system for performing methods above are described.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
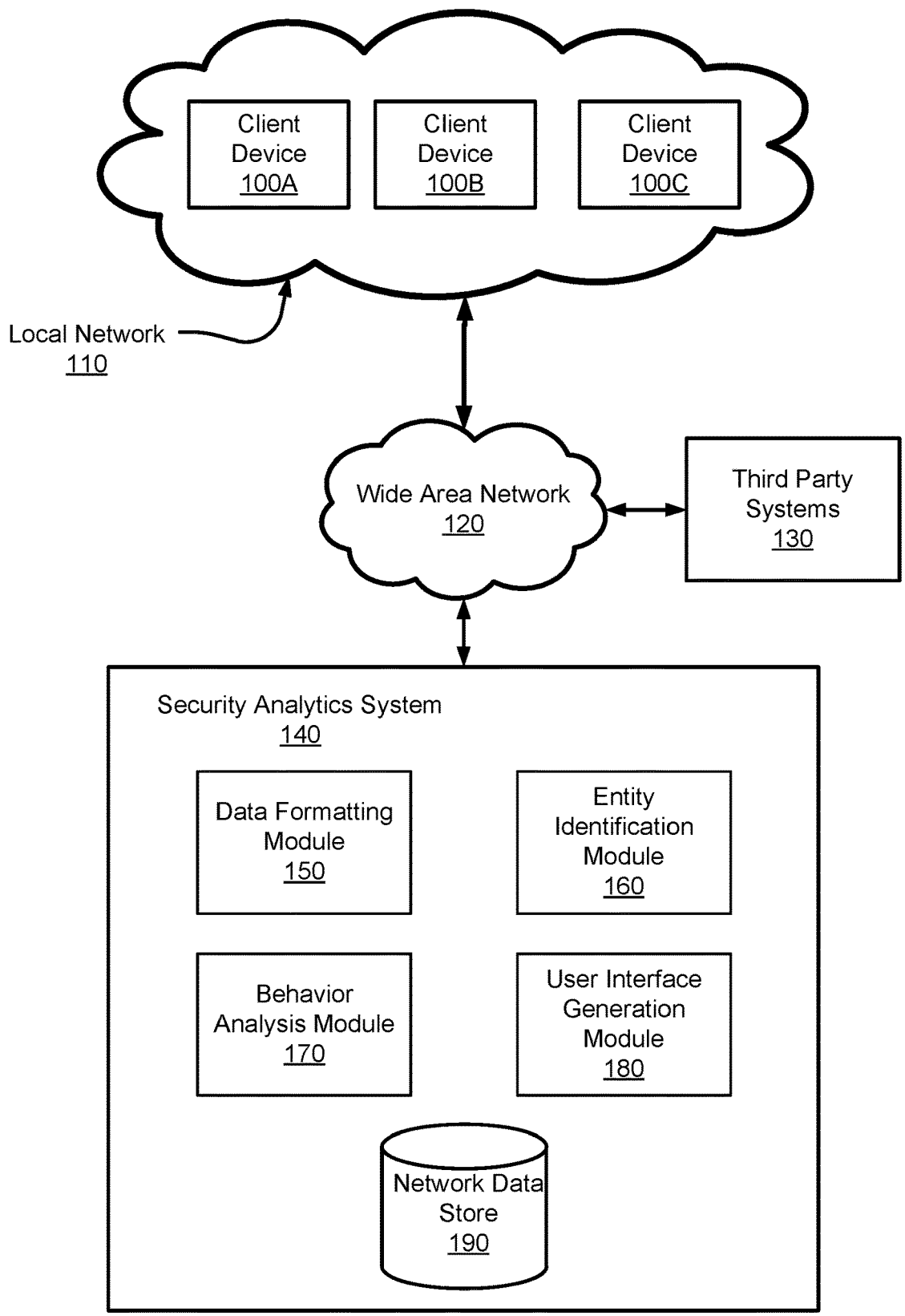
FIG. 1 illustrates a system environment and system architecture for a security analytics system, in accordance with some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a security analytics system. The security analytics system can be a system, method and/or a computer program product (e.g., a computer readable storage medium that stores instructions executable by one or more processing units). The security analytics system detects security threats in a local network by analyzing the behavior of entities in the local network.

Security threats include unauthorized software, devices, users, or other entities that access/deny access, misuse, or modify a network or information contained thereon. In some embodiments, security threats can include software, devices, or users that are improperly given authorization to access/deny access, misuse or modify the network or information thereon. Security threats may originate from an entity in a local network that is exhibiting malicious behavior. An entity is a physical or logical subject of analysis, and can be a user, a device, or a group of users and/or devices.

The security analytics system collects data about entities in the local network. In some embodiments, the security analytics system uses an application or process running on the devices local network to collect data logged by the devices about the entities, such as operating system event logs, file system information, database logs, file sharing logs, and network traffic monitoring logs.

In some embodiments, the raw data is filtered by the security analytics system to extract data fields from the raw data that are relevant to detecting security threats in the local network. In some embodiments, the raw data is filtered by parsing the raw data and searching for key words or phrases, and values associated with them. The filtered data can be converted into structured data that better formats the information in the filtered data to be used by the security analytics system. In some embodiments, the structured data is formatted based on a set of schema that define data fields from the filtered data to be stored together. Each schema may be configured to structure related data fields together to more effectively analyze the behavior of entities in the local network.

The security analytics system can use the structured data to determine whether an entity in the local network is exhibiting malicious behavior. A set of features can be generated using the structured data. In some embodiments, the features are generated from computations performed on the structured data. The security analytics system can use the generated features to build machine-learned models of the behavior of entities in the local network. In some embodiments, the security analytics system also applies rules that specify malicious or non-malicious behavior for entities to the features.

In some embodiments, the security analytics system uses the machine-learned models and the rules to generate threat scores for entities in the local network. The threat scores may be numeric values that represent the likelihood that an entity is associated with a security threat. In some embodiments, the security analytics system uses a threshold for a threat score to determine whether an entity is exhibiting malicious behavior. If the security analytics system determines that a security threat is present in the local network, it can provide an indication of the security threat to a network administrator for the local network. In some embodiments, the security analytics system will quarantine, or request to quarantine, an entity in the local network.

Example System Environment and Architecture

FIG. 1 illustrates a system environment and system architecture for a security analytics system, in accordance with an example embodiment. The functionality of the modules in FIG. 1 can be performed by additional, fewer, or different modules and the functionality of the modules can be divvied between modules differently from how it is described below. For example, some or all of the functionality of the security analytics system 140 may be performed on the client devices 100A, 100B, and 100C (referred to collectively as client devices 100), or vice versa. The system environment illustrated in FIG. 1 shows client devices 100, a local network 110, a wide area network 120, one or more third party systems 130, and a security analytics system 140.

Client Device

The client devices 100 are one or more computing devices capable of receiving user input as well as transmitting and/or receiving data via the local network 110. In some embodiments, a client device 100 is a conventional computer system, such as a desktop/laptop computer or a server. In other embodiments, a client device 100 may be a device having computer functionality, such as a personal digital assistant (PDA), a mobile telephone, a smartphone, or another suitable device. A client device 100 is configured to communicate via the local network 110 and the wide area network 120.

Local Network and Wide Area Network

The client devices 100 are configured to communicate via the local network 110 and the wide area network 120, which may use both wired and/or wireless communication systems. In some embodiments, the local network 110 and wide area network 120 use standard communications technologies and/or protocols. For example, the local network 110 and wide area network 120 may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the local network 110 and wide area network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the local network 110 and wide area network 120 may be represented using any suitable format, such as hypertext markup language (HTML) or extensible markup language (XML). In some embodiments, all or some of the communication links of the local network 110 and wide area network 120 may be encrypted using any suitable technique or techniques.

The local network 110 can be a network that operates within or is managed by a single network administrator. The network administrator may be one or more individuals, and may be associated with an organization. For example, the network administrator may be associated with a home, organization, or company. The wide area network 120 can be a network that allows client devices 100 within different local networks 110 to communicate with each other. For example, client devices 100 within a home local network 110 may use the wide area network 120 to communicate with client devices in a company's local network 110.

In some embodiments, a network administrator for the local network 110 uses a client device 100 to monitor the local network 110. The network administrator may receive information about entities within the local network 110 and use that information to maintain and improve the local network 110. The network administrator may also receive information from the security analytics system 140 about the behavior of entities within the local network 110 and about security threats within the local network 110. In some embodiments, the network administrator is a user of the local network 110. In some embodiments, the network administrator is a designated user with special privileges within the local network 110.

Client Device Data and Network Data Collection

In some embodiments, a client device 100 executes an application or process (not shown) to collect raw data from the client device 100 about entities within the local network 110, and to send this raw data to the security analytics system 140. The client device 100 can collect the raw data using the Syslog protocol (RFC 5424), captured/forwarded raw network traffic, event streams from other Syslog repositories, or data collected by software information and event management software or other software. The raw data collected by the application can include information about entities in the local network 110, such as 1) the client device 100 from which the data is being collected, 2) other devices in the local network 110, and 3) the local network 110 as a whole. The raw data can contain data fields that each contain specific information about the entities in the local network 110. In some embodiments, data fields are associated with a type and a value. The raw data can contain information from a wide variety of sources and from all layers of the technology stack, including, but not limited to:

hardware events (e.g., interrupts)
    virtualization layer logs
    system state information
    file system information
    operating system event logs
    network device logs (e.g. logs for Dynamic Host Configuration Protocol (DHCP), Domain Name System (DNS), routers, and switches)
    security monitoring tool logs (e.g. logs from intrusion detection systems (IDS), intrusion prevention systems (IPS), proxies, and firewalls)
    network traffic monitoring logs (e.g. deep packet inspection metadata, NetFlow®)
    authentication logs (e.g. Microsoft® Active Directory or LDAP systems)
    application firewall logs
    database logs
    file sharing logs
    web server access logs
    email logs/content/metadata
    content management system logs
    physical access logs, and
    business policies and audit rules.

The security analytics system 140 receives the raw data. In some embodiments, the security analytics system 140 receives the raw data by intercepting network communications to/from the client device 100, and extracts the raw data from the network communications. In some embodiments, the security analytics system 140 may pre-process the raw data, such as by aggregating the raw data fields or reformatting the raw data.

Third Party Systems

The third party systems 130 can communicate with the client devices 100 through the wide area network 120 and the local network 110. For example, the client devices may download webpages, pictures, videos, or other content from the third party systems 130. Some third party systems 130 may provide a service for users of the client devices 100. For example, the third party systems 130 could be a social networking system, a search engine, an online retailer, or a document storage system. However, other third party systems 130 may be malicious, and/or may be in coordination with, security threats in the local network 110. For example, the third party systems 130 could be a phishing website or a website operated by a user intending to gain unauthorized access to the local network 110.

In some embodiments, the third party systems 130 communicate with the security analytics system 140 to provide additional context to the security analytics system 140 when determining whether a security threat is present in the local network 110. For example, the third party systems 130 may provide domain information that allows the security analytics system 140 to identify the senders and/or recipients of network traffic through the local network 110. The security analytics system 140 may retrieve this domain information by communicating with third party systems 130 that offer WHOIS directory information and/or DNS lookups to identify senders and/or recipients of network traffic in the local network 110 to identify potentially malicious behavior. Third party systems 130 may also provide feeds to the security analytics system 140 that contain information about security threats. For example, a third party system 130 may provide the security analytics system 140 with feeds containing Internet Protocol (IP) address blacklists and reputations, domain name blacklists and reputations, phishing Uniform Resource Locator (URL) blacklists, malware binaries, and malware metadata, in response to a request by the security analytics system 140. This information may be used by the security analytics system 140 to detect security threats within the local network 110.

Security Analytics System

In the embodiment shown in FIG. 1, the security analytics system 140 is shown with a data formatting module 150, an entity identification module 160, a behavior analysis module 170, a user interface generation module 180 and a network data store 190. However, in other embodiments, the security analytics system 140 can include different components. Conventional components such as network interfaces, security functions, load balancers, failover servers, management and network operations consoles, and the like are not shown so as to not obscure the details of the system architecture.

Data Formatting Module

Figure 2A:
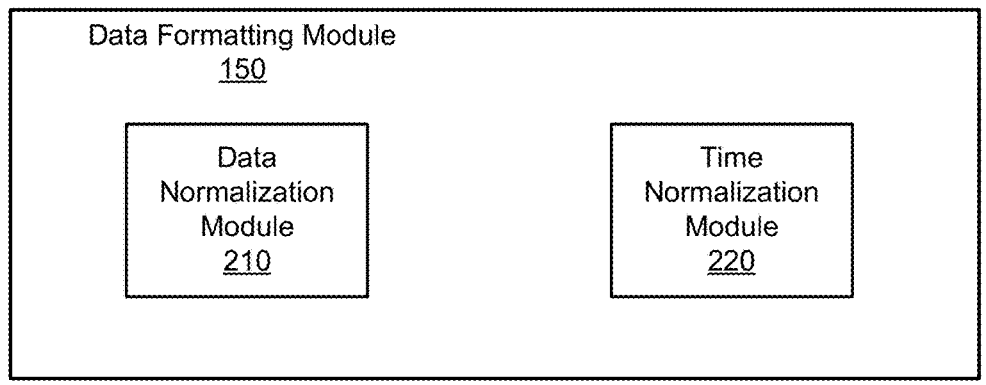
FIG. 2A illustrates the components of the data formatting module, in accordance with some embodiments.

The data formatting module 150 receives data about the local network 110 and formats it in preparation for analysis by the entity identification module 160 and the behavior analysis module 170. Referring now to FIG. 2A, the data formatting module 150 is shown with a data normalization module 210 and a time normalization module 220. The functionality of the modules in FIG. 2A can be performed by additional, fewer, or different modules and the functionality of the modules can be divvied between modules differently from the description below.

The data normalization module 210 takes raw data received from the client devices 100 and converts the raw data into structured data. The data fields with important information may be stored separately within the raw data from other related data fields. For example, the MAC address for a client device 100 associated with a particular IP address may be stored in a separate log file from data indicating the amount of network traffic that has traveled to/from the IP address. Additionally, the raw data may contain the same information repeated in multiple locations. By converting the raw data to structured data, the security analytics system 140 can store related fields of information together and filter out redundant or unnecessary information.

The data normalization module 210 can filter the raw data based on the relevance of information within the raw data. In some embodiments, the raw data is filtered based on a pre-determined format of the raw data. For example, if the raw data contains a particular type of system log (e.g., a user access control log), then the data normalization module 210 may automatically filter out particular data fields contained in that log that it has pre-determined is not relevant to detecting security threats. In these embodiments, the information to be filtered may be pre-determined by a user of the security analytics system 140 or by the developers of the security analytics system 140. In some embodiments, the data normalization module 210 filters the raw data based on machine-learned models of relevant data fields in the raw data. The data normalization module 210 may receive feedback from the behavior analysis module 170 about the relevance of certain data fields in detecting security threats. The data normalization module 210 may use the feedback to retain effective data (or data similar to the effective data) when filtering the raw data. Similarly, the data normalization module 210 may use the feedback to filter out data that it determines is not relevant. In some embodiments, the data normalization module 210 ranks the data fields based on the relevance of the data fields to detecting a security threat in the local network. The relevance of a data field may be pre-determined by developers or may be determined by the data normalization module 210 based on threat models. In some embodiments, the data normalization module 210 uses the filtered raw data to generate the structured data.

In some embodiments, the data normalization module 210 determines the format of the raw data in order to extract information from the raw data. To do so, the data normalization module 210 may parse the raw data and identify key words or phrases within the log data to identify the information it needs to generate the structured data. For example, if the raw data contains the phrase "Download Usage" and it is followed immediately with a numerical value, the data normalization module 210 may identify the numerical value as the amount of data downloaded by an entity. In some embodiments, the data normalization module 210 may infer variations of key words or phrases using the Levenshtein edit distance metric. The data normalization module 210 may also use the format or value of information to determine what the information represents. For example, if a data field is formatted as "X.X.X.X" where each X is a numerical value between 0 and 255, the data normalization module 210 may determine that the field of information is an IP address.

In some embodiments, the data normalization module 210 uses a set of schema to convert the raw data to structured data. Each schema can be used to generate a particular type of structured data from the raw data. This allows the data normalization module 210 to aggregate related data fields from the raw data together without forcing all data fields from the raw data into a single type of structured data. For example, one schema may be used to aggregate network traffic information about a group of entities and another schema may be used to aggregate entity identification information. In some embodiments, a schema may identify data fields in the raw data to collect into a type of structured data. For example, a schema may identify the timestamps from certain hardware events to include in a type of structured data. In some embodiments, each schema is used to aggregate information to be used by a particular process or component of the security analytics system 140. For example, a schema may be used to aggregate all data that is relevant to detecting a particular security threat in the local network 110. In some embodiments, a schema may contain information that is also present in another schema, e.g. a field that exists in one schema may also exist in another schema. An example schema for network communications includes the timestamp when the network communication was received, an identifier for an entity that is associated with the communication, the type of the method, a URL associated with the communication, the IP address or port number of the sender or receiver of the communication, or the size of the network communication.

The time normalization module 220 normalizes timestamps within the raw data. Example timestamps include times when a network communication is sent or received, when a system event occurs, or when an entity performs an action. The timestamps within the raw data may be inconsistent. For example, some devices may be set to local times, and others may be set to Coordinated Universal Time (UTC). Some timestamps may have been generated using a clock that is out of sync. The timestamp may even be missing certain pieces of information (e.g. year, time zone) or may be missing entirely. Therefore, the time normalization module 220 normalizes the timestamps within the raw data to ensure the timestamps are consistent, accurate, and complete.

In some embodiments, the time normalization module 220 uses the context provided by the raw data to normalize the timestamps. For example, the raw data may allow the time normalization module 220 to determine the time zone of a timestamp, the year of a timestamp, or to interpolate a missing timestamp. The time normalization module 220 may also identify and correct information within the raw data that it determines to be incorrect. For example, the time normalization module 220 may correct or ignore lines within a log file that the time normalization module 220 determines have been logged incorrectly (e.g. the line is not complete or the line is incorrectly split between two lines). In some embodiments, the time normalization module 220 may provide a range of potential timestamps when normalizing a timestamp if it cannot confidently adjust the timestamp to a single normalized timestamp. In some embodiments, if the time normalization module 220 determines that a timestamp is incorrect or missing (e.g., having an incorrect format), the time normalization module 220 replaces the timestamp with the time when the client device generated the timestamp, the time when the time normalization module 220 receives the incorrect or missing timestamp, or the time when the time normalization module 220 processes the timestamp.

TABLE 1

Example System Entry Log

| Time | Entity ID | Destination | Method | Port | Category | Bytes In | Bytes Out |
|---|---|---|---|---|---|---|---|
| 2015-10-13 T10:00:00 | entity_id1 | xyz1.com | GET | 80 | OBSERVED | 29193 | 329998 |

Table 1 above illustrates a system log describing a network communication sent by a client device. It includes a time entry and information about the network communication, such as the destination of the communication and an identifier for the entity transmitting the communication. If the time entry was incomplete (e.g. leaves out the seconds information) or is incorrect (e.g. is a few seconds off), the time normalization module 220 can use the additional information in the system log (e.g. entity ID, destination, bytes in, and bytes out) to correct the timestamp. For example, if the time stamp reads "2015-10-13 T 10:00" leaving out the seconds portion of the timestamp, and another system log describes the same entity sending a network communication at "2015-10-13 T 10:00:00", the time normalization module 220 updates the system log with "2015-10-13 T 10:00:00."

Entity Identification Module

Referring now to FIG. 1, the entity identification module 160 identifies and describes relationships between the entities within in the structured data. As described above, entities are physical or logical subjects of analysis, and can be users, client devices 100, or groups of users or client devices. The entity identification module 160 determines relationships between entities based on information contained in the structured data. In some embodiments, the entity identification module 160 uses an entity graph to represent the relationships between the entities. In these embodiments, the entities can be the nodes of the entity graph and the relationships between the entities can be the edges of the entity graph.

The relationships identified by the entity identification module 160 can be of different types, including ownership relationships, membership relationships, and co-residence relationships. An ownership relationship is a relationship between one or more users and one or more client devices 100 wherein the users "own" the client devices 100. For example, if a user is assigned to a particular workstation, then the user would "own" that workstation. Similarly, if a server is managed and maintained by a group of engineers, the group of engineers may "own" the server. As another example, a device may be owned by a user if that device is used by that user for a majority of the time. A membership relationship is one where an entity is a part of a larger group of entities. For example, a server may be a member of a cluster with other servers or a user may be a member of a peer group. A member relationship can be represented as a relationship between a user/client device entity and a group entity or between two or more user/client device entities that are a part of a group. A co-residence relationship is one where the activities of one entity can be matched to another entity as well. For example, if a user logs into a client device 100 in the local network 110, then actions taken by the client device 100 can be associated with the user and vice versa, and thus the user and the client device have a co-residence relationship.

In some embodiments, a relationship between entities is determined by the entity identification module 220 based on properties of the entities. Entity properties are characteristics about an entity that are discoverable from data collected from the local network. In some embodiments, entity properties are determined based on data fields that are parsed out of the raw data received from the local network 110 or based on data fields in the structured data. Examples of entity properties include the MAC address of a client device 100, the geographic location of the entity, the operating system of a client device 100, an application running on a client device, a user logged into a client device 100, a primary user assigned to a client device 100, and user privileges on a device. For example, the entity identification module 220 may determine the user assigned to a client device using raw data from a directory services database. In some embodiments, the entity identification module 160 establishes a relationship between entities if they share at least one entity property. In some embodiments, the entity identification module 160 will only establish a relationship between entities if they share at least one of a set of particular entity properties.

Entity properties can be temporary or permanent characteristics of an entity. For example, a dynamic IP address might be a temporary entity property and a MAC address or username might be permanent entity properties. In some embodiments, temporary entity properties are associated with timestamps or timeframes for when the entity property was associated with the entity. For example, a dynamic IP address may be associated with the timestamp at which the IP address was assigned to the entity.

In some embodiments, relationships between entities are associated with timeframes during which the relationship exists. For example, if a user is logged into a client device 100 during a particular timeframe, a relationship between the user and the client device 100 stored by the entity identification module 160 may be associated with the timeframe during which the user was logged into the client device. In some embodiments, the timeframe of a relationship is determined based on timestamps and/or timeframes associated with temporary entity properties.

In some embodiments, the entity identification module 160 augments and/or modifies the structured data with identifier information based on relationships between the entities. For example, the entity identification module 160 may include an identifier for a user into structured data relating to a client device 100 with which the user has a relationship.

Behavior Analysis Module

Figure 2B:
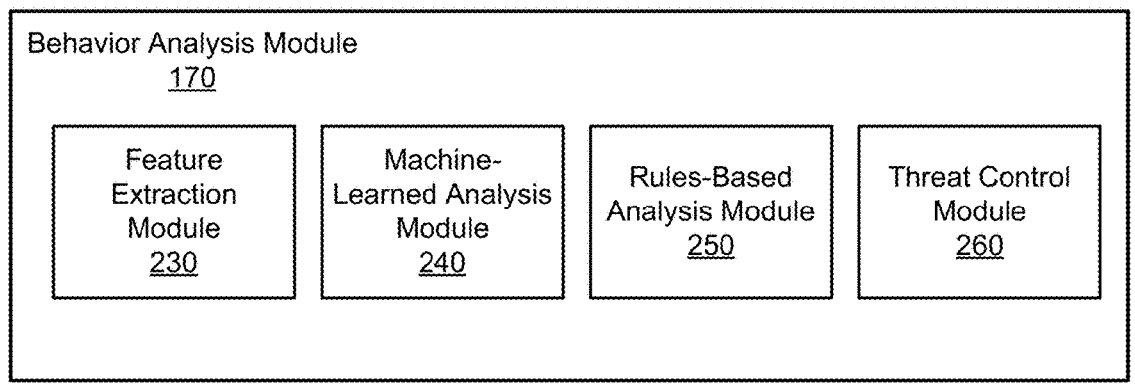
FIG. 2B illustrates the components of a behavioral analytics module, in accordance with some embodiments.

The behavior analysis module 170 identifies security threats within the local network 110 based on the structured data produced by the data formatting module 150 and the relationships between entities identified by the entity identification module 160. Referring now to FIG. 2B, the behavior analysis module 170 is shown with feature extraction module 230, a machine-learned analysis module 240, and a rules-based analysis module 250. The functionality of the modules in FIG. 2B can be performed by additional, fewer, or different modules and the functionality of the modules can be divvied between modules differently from how it is described below.

The feature extraction module 230 generates features of the local network 110 based on the structured data. Features are meaningful data elements and/or aggregates that are derived from the structured data. The features describe aspects of the local network 110 that are important for detecting security threats that may be present in the local network 110. In some embodiments, features can be aggregates of data for all entities in the local network. For example, the mean amount of data downloaded by client devices 100 within the local network 110 could be used as a feature. In some embodiments, a feature can be generated using a statistical model and/or historical data of some aspect of the local network 110. For example, the feature extraction module 230 may use a normal distribution of packet size to determine the likelihood that a packet of a particular size would occur.

In some embodiments, a preliminary set of features is generated based on the structured data. The preliminary set of features is generated using simple computations that can be performed quickly. For example, a list of all destinations for network traffic sent out of the local network may be included in the preliminary set of features. A secondary set of features may be generated based on the preliminary set of features and the structured data. The secondary set of features is generated using more complex and intensive computations. For example, using the list of all locations for all network traffic sent out of the local network from the preliminary set of features, the feature extraction module 230 may determine the rate at which devices within the local network 110 communicate with each destination. In some embodiments, the preliminary set of features is generated using a computer system configured to perform distributed computations effectively, and the secondary set of features is generated using a computer system configured to perform serial computations effectively.

The preliminary set of features may include features extracted from network traffic records, such as, but not limited to:

- the source or destination hostname
- the source or destination internet address
- the number of HTTP connections made to the domain
- the types of network connections made
- a category of a website with which a client device 100 has communicated
- a source or destination port
- a number of bytes uploaded and downloaded
- a type of a data request sent from or received by a client device 100
- how often the client devices 100 communicate with a website
- the number of distinct websites the client devices 100 communicate with
- the age of the domain registration.

The preliminary features for access and authentication activity may include features extracted from directory access records, such as an authentication request status, an authentication type, a multiplicity or uniqueness of a user, a multiplicity or uniqueness of a source host, or super user activity. The secondary set of features can include computations performed on the preliminary set of features, such as counts, distinct counts, minima, maxima, averages, ratios, medians, percentiles, variances/entropies, or inter-quartile ranges.

The machine-learned analysis module 240 applies machine-learned models to features generated by the feature extraction module 230 to detect security threats. The machine-learned analysis module 240 generates a set of machine-learned models using historical data stored by the security analytics system 140. In some embodiments, the machine-learned models are based on historical data for a specified period of time in the past. For example, the machine-learned models may be generated based on the last week's, month's, or year's worth of historical data. In some embodiments, a machine-learned model is generated for each entity in the local network 110. For example, the machine-learned analysis module 240 may generate a model of IP addresses with which an entity communicates. In some embodiments, a machine-learned model is generated to describe a type of entity. For example, one machine-learned model may be used for users and another machine-learned model for client devices 100. In another example, a machine-learned model may be used to describe the behavior of a user with particular properties (e.g. an engineer, a network admin). These machine-learning models may use different techniques to model these features, including parameter estimation for a time series, probability estimation for a given point in time, heuristics, clustering, dimensional reduction, probability distribution of a feature vector, and/or path-length analysis.

Machine-learned models are used to determine behavior of entities within the local network 110 that is representative of malicious behavior. Machine-learned models can look for significant changes in an entity's behavior, atypical behavior for an entity with particular properties and unusual relationships between entities. In some embodiments, the machine-learned analysis module 240 uses information from third party systems 130 to detect malicious behavior. For example, the machine-learned analysis module 240 may use whois directory information or DNS lookups to identify systems with which entities in the local network 110 are communicating. As another example, the machine-learned analysis module 240 may use threat feeds from third party systems 130 to identify malicious IP addresses in communication with entities in the local network 110. In some embodiments, the machine-learned models use information accumulated from multiple local networks 110 to detect security threats. In some embodiments, the machine-learned models use information provided by a network administrator of the local network 110, such as user privilege information, user account information, an organizational chart, and user-device pairings.

The machine-learned analysis module 240 determines the likelihood that a security threat is present in the local network 110 using the machine-learned models. The likelihood that a security threat is present in the local network 110 can be represented using a numeric threat score generated by the machine-learned analysis module 240. In some embodiments, a threat score is determined for each entity in the local network, wherein the threat score represents the likelihood that the entity is performing malicious behavior. In some embodiments, each machine-learned model generates a threat score that a security threat is present in the local network 110. In some embodiments, the machine-learned models use the threat scores from other machine-learned models to generate a threat score. In some embodiments, a threat score is a Boolean value for whether a security threat is present in the local network 110.

The rules-based analysis module 250 uses pre-determined rules and heuristics for identifying security threats within the local network 110. Rules can be created by the developers of the security analytics system 140, or by users and network administrator of the local network 110. For example, a rule may be created that a spike in attempts to access a document, a spike in firewall denials, a spike in network access (e.g., a count of a certain type of network activity, such as new open connections, above a certain threshold), and/or newly observed activity within the local network 100 (or any combination of these events) indicates a high likelihood that a security threat is present in the local network 110. In some embodiments, the rules are based on details of the local network 110 provided by the users and network administrator of the local network 110. A rule can be embodied in an equation that weighs certain features to determine a final numerical score.

The rules used by the rules-based analysis module 250 are applied to the structured data and determine a likelihood that a security threat is present in the local network 110. In some embodiments, the likelihood that a security threat is present in the local network is represented using a numeric threat score. The rules can be based on a type or property of an entity and/or on historical data of the local network 110. In some embodiments, the rules used by the rules-based analysis module 250 identify particular actions as representative of malicious behavior. For example, a rule may specify that any interaction with a malicious IP address by an entity within the local network 110 must have been due to a security threat present in the local network 110. In some embodiments, a threat score is determined for each entity in the local network, wherein the threat score is the likelihood that the entity is performing malicious behavior. In some embodiments, each rule generates a score that a security threat is present in the local network 110. In some embodiments, the threat score is a numeric value. In some embodiments, the score is a Boolean value for whether a security threat is present in the local network 110.

In some embodiments, a rule uses threat scores from the machine-learned analysis module 240 or from other rules to determine a threat score. The rules can also adjust the threat scores generated by the machine-learned analysis module 240. For example, a network administrator may create a rule that increases a threat score generated by a machine-learned model for a particular type of security threat to make the security analytics system 140 more responsive to that type of security threat. In some embodiments, a rule can overrule a threat score generated by a machine-learned model. For example, a rule may be used to prevent a machine-learned model from incorrectly generating a threat score representing a high likelihood of a security threat being present in the local network 110.

In some embodiments, the rules-based analysis module 250 uses information from third party systems 130 to generate threat scores. For example, the rules-based analysis module 250 may use WHOIS directory information or DNS lookups to identify systems with which entities in the local network 110 are communicating. As another example, the rules-based analysis module 250 may use threat feeds from third party systems 130 to identify malicious IP addresses in communication with entities in the local network 110. In some embodiments, the rules-based analysis module 250 uses information accumulated from multiple local networks 110 to detect security threats. In some embodiments, the rules-based analysis module 250 uses information provided by a network administrator of the local network 110, such as the sources described above for the machine-learned analysis module 240.

The threat control module 260 makes a determination of whether a security threat is present in the local network 110. The threat control module 260 can make the determination based on threat scores generated by the machine-learned analysis module 240 and the rules-based analysis module 250. In some embodiments, the threat control module 260 uses a threshold or a confidence level to make the determination. For example, the threat control module 260 may have a threat score threshold for the generated scores, and if a threat score exceeds the threat score threshold, then the threat control module 260 may determine that a security threat is present in the local network 110. In some embodiments, the threat control module 260 applies weightings to the threat scores and makes a determination based on the weightings. In some embodiments, the threat control module 260 determines the type of the security threat based on the threat scores. The threat control module 260 can also determine that more than one security threat may be present in the local network 110.

Upon determining that a security threat is present in the local network 110, the threat control module 260 alerts the network administrator to the security threat. In some embodiments, the network administrator is alerted through a user interface of an application that is running on a client device 100 associated with the network administrator. In some embodiments, the network administrator is alerted through an email, text message, phone call, or notification on a mobile application. In some embodiments, the threat control module 260 quarantines an entity that it has determined is exhibiting malicious behavior. For example, the threat control module 260 may restrict a user from logging into client devices 100 or may prevent a client device 100 from communicating with devices outside of the local network 110. In some embodiments, the threat control module 260 prevents an entity from accessing sensitive information if the threat control module 260 has determined that the entity has exhibited malicious behavior. In some embodiments, the threat control module 260 prohibits entities from communicating with particular IP addresses or domains outside of the local network 110. In some embodiments, the threat control module 260 notifies the network administrator of a security threat and awaits instructions from the network administrator before quarantining an entity. The threat control module 260 may use multiple thresholds for a threat score to determine a course of action to take regarding a potential security threat. For example, if a threat score only exceeds a low threshold, the threshold control module 260 may only notify the network administrator of a potential security threat. If a threat score exceeds a high threshold, the threshold control module 260 may quarantine the entity associated with the potential security threat.

In some embodiments, the threat control module 260 maintains a watch list of entities that may be exhibiting malicious behavior. An entity may be added to the watch list if the threat scores from the machine-based analysis module 240 or from the rules-based analysis module 250 are higher would be expected for an entity, but not high enough that the threat control module 260 can confidently determine that the entity is exhibiting malicious behavior. For example, the threat control module 260 may add an entity to the watch list based on the threat scores for similar entities or based on the historical threat score for the entity. In some embodiments, a threat score for an entity must exceed a threshold or confidence level for the entity to be added to the watch list. In some embodiments, the watch list is provided to the network administrator through a user interface. In some embodiments, the threat control module 260 determines whether an entity is exhibiting malicious behavior based on the generated threat scores and whether the entity is on the watch list.

User Interface Generation Module

In some embodiments, the threat control module 260 transmits information about entity behavior and security threats to the user interface generation module 180 to be presented to the network administrator. Referring now to FIG. 1, the user interface generation module 180 generates a user interface to be transmitted to the network administrator to review the state of the local network. The user interfaces can contain information about the entities in the local network. For example, the user interfaces may contain information that identifies the entities in the local network 110 and describes the actions taken by those entities. In some embodiments, the user interfaces contain information about threat scores generated by the behavior analysis module 170. The user interfaces can also contain information about the watch list of the entities in the local network 110. In some embodiments, the user interface generation module 180 generates a user interface with a graphical representation of an entity graph generated by the entity identification module 160. User interfaces generated by the user interface generation module 180 are further described below.

Network Data Store

The network data store 190 stores information about the local network 110. The network data store 190 can store the raw data received from the local network 110 and/or the structured data generated by the data formatting module 150. In some embodiments, the network data store 190 stores the threat scores generated by the behavior analysis module 170. The network data store 190 can store historical data about the local network to be used by the behavior analysis module 170 to identify security threats in the local network 110. In some embodiments, the network data store stores information about the local network that is provided by the network administrator, such as user credentials, user privileges, and client device properties. The network data store 190 can also store information received from third party systems 130 that is used to provide additional context to the behavior analysis module 170 to detect security threats in the local network 110.

Example Method for Identifying Relationships between Entities

Figure 3:
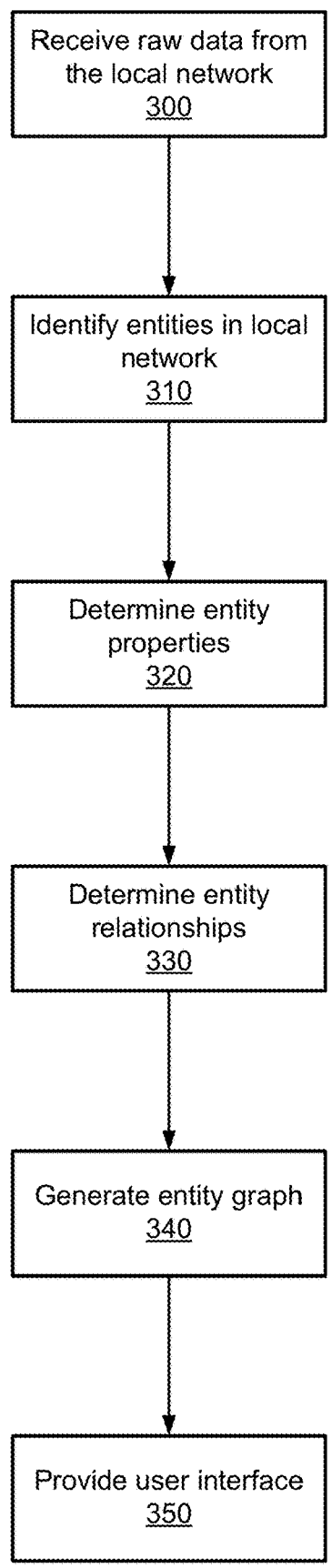
FIG. 3 is a flowchart illustrating a method for identifying entities within a local network, in accordance with some embodiments.

FIG. 3 is a flowchart illustrating a method for identifying entities within a local network, in accordance with some embodiments. The steps for the method presented in FIG. 3 could be performed in a different order, and the method might include additional, fewer, or different steps. The method can be embodied as instructions stored in a non-transitory computer readable storage medium and executable by a processor and/or controller. In one embodiment, the method described in FIG. 3 is performed by the security analytics system as described above.

The security analytics system receives 300 raw data from the local network. The raw data can contains information about the behavior of entities within the local network, including information from event logs, authentication logs, database logs, and file system information. In some embodiments, the raw data contains information about the behavior of at least one user of the local network and at least one client device.

The security analytics system identifies 310 the entities in the raw data and determines 320 a set of properties about each of the identified entities. In some embodiments, the entity properties are determined based on data fields in the raw data. The entity properties contain information about the entity, such as the type of the entity, the MAC address of a device and the geographic location, and can be temporary or permanent properties about the entity.

The security analytics system determines 330 relationships between the identified entities. In some embodiments, the entity relationships are determined based on the entity properties for the identified properties. For example, the security analytics system may establish relationships between two entities if they share a property. An entity graph is generated 340 that describes the entity relationships. In some embodiments, the nodes of the entity graph represent entities and the edges of the entity graph represent entity relationships. The edges can also contain timeframes during which the relationship associated with the edge existed. The security analytics system provides 350 a user interface to a user that contains the entity graph and the relationships described therein.

Example Method for Extracting Features from Network Data

Figure 4:
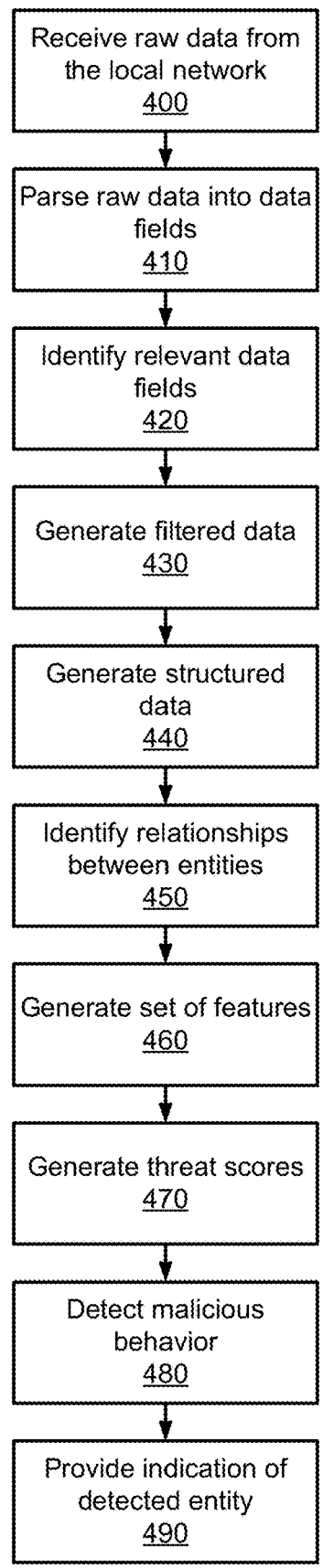
FIG. 4 is a flowchart illustrating a method for extracting features from raw data from a local network, in accordance with some embodiments.

FIG. 4 is a flowchart illustrating a method for extracting features from raw data from a local network, in accordance with some embodiments. The steps for the method presented in FIG. 4 could be performed in a different order, and the method might include additional, fewer, or different steps. The method can be embodied as instructions stored in a non-transitory computer readable storage medium and executable by a processor and/or controller. In one embodiment, the method described in FIG. 4 is performed by the security analytics system as described above.

The security analytics system receives 400 raw data from the local network. The raw data can contains information about the behavior of entities within the local network, including information from event logs, authentication logs, database logs, and file system information. In some embodiments, the raw data contains information about the behavior of at least one user of the local network and at least one client device.

The security analytics system parses 410 the raw data into data fields. Data fields are individual pieces of data that contain a type and a value. In some embodiments, the security analytics system identifies values associated with key words and phrases in log files contained in the raw data to determine the data fields. In some embodiments, the security analytics system identifies the data fields in raw data that is formatted in a pre-determined way.

The security analytics system identifies 420 a subset of the data fields based on the relevance of the data fields to detecting security threats in the local network. The relevant data fields can be pre-determined by the security analytics system or may be determined using machine learning. The security analytics system generates 430 filtered data containing the subset of data fields and generates 440 structured data based on the filtered data. In some embodiments, the structured data is divided into portions that are each structured in accordance with a schema that specifies data fields to include in the portion of data.

The security analytics system identifies 450 relationships between the plurality of entities and generates 460 a set of features based on the structured data and the identified relationships and generates 470 one or more threat scores based on the set of features. The security analytics system detects 480 malicious behavior performed by an entity in the local network based on the generated threat scores and provides 490 an indication of the detected entity to a user.

Example Method for Detecting Security Threats

Figure 5:
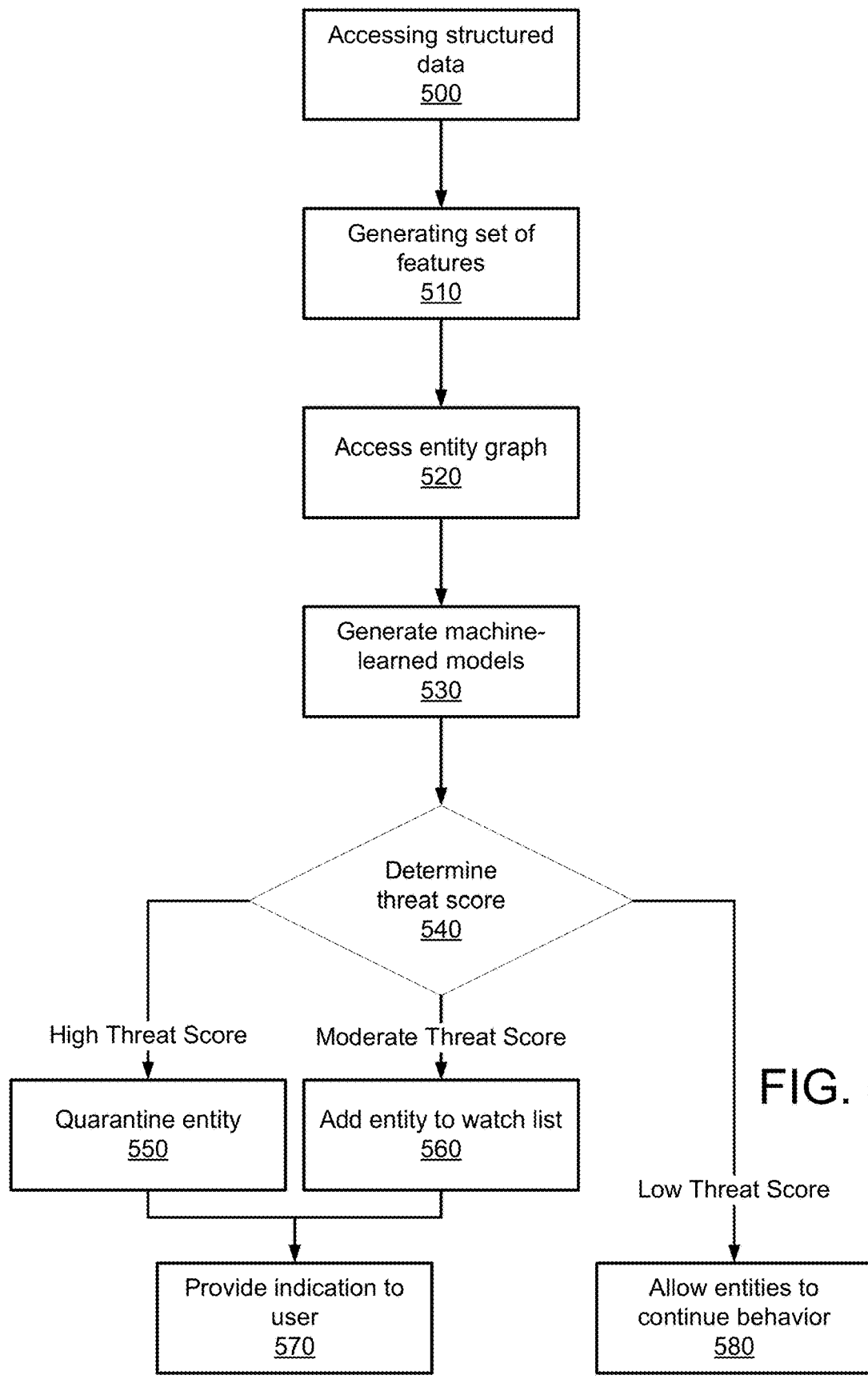
FIG. 5 is a flowchart illustrating a method for detecting security threats in a local network, in accordance with some embodiments.

FIG. 5 is a flowchart illustrating a method for detecting security threats in a local network, in accordance with some embodiments. The steps for the method presented in FIG. 5 could be performed in a different order, and the method might include additional, fewer, or different steps. The method can be embodied as instructions stored in a non-transitory computer readable storage medium and executable by a processor and/or controller. In one embodiment, the method described in FIG. 5 is performed by the security analytics system as described above.

The security analytics system accesses 500 structured data describing a plurality of entities within a local network. In some embodiments, the structured data is divided into portions that are each structured in accordance with a schema describing similar fields of data from the structured data. The security analytics system generates 510 a set of features describing aspects of the structured data and aspects of the entities described within the structured data. In some embodiments, the features require computations to be performed on the structured data.

The security analytics system accesses 520 an entity graph describing relationships between the entities in the local network and generates 530 machine-learned models of the entities. In some embodiments, the machine-learned models are generated based on the structured data and the relationships described by the entity graph. The security analytics system determines 540 the likelihood that an entity in the local network is exhibiting malicious behavior. In some embodiments, the likelihood is represented using a numeric score. If the security analytics system generates a high threat score, the entity associated with the security threat is quarantined 550. The security analytics system can quarantine an entity by restricting the communication of a device and by restricting the access of an entity to sensitive information in the local network. In some embodiments, the security analytics system receives the approval of a network administrator before quarantining the entity. If a moderate threat score is generated, the security analytics system may add 560 the entity associated with the security threat to a watch list. In some embodiments, if an entity stays on the watch list for some period of time, then the entity is quarantined. In some embodiments, if a high or moderate threat score is generated, an indication is provided 570 to the user of the action taken by the security analytics system in response to the threat score. If a low threat score is generated, the security analytics system allows 580 the entities in the local network to continue their current behavior.

Example of Data Flow through the Security Analytics System

Figure 6:
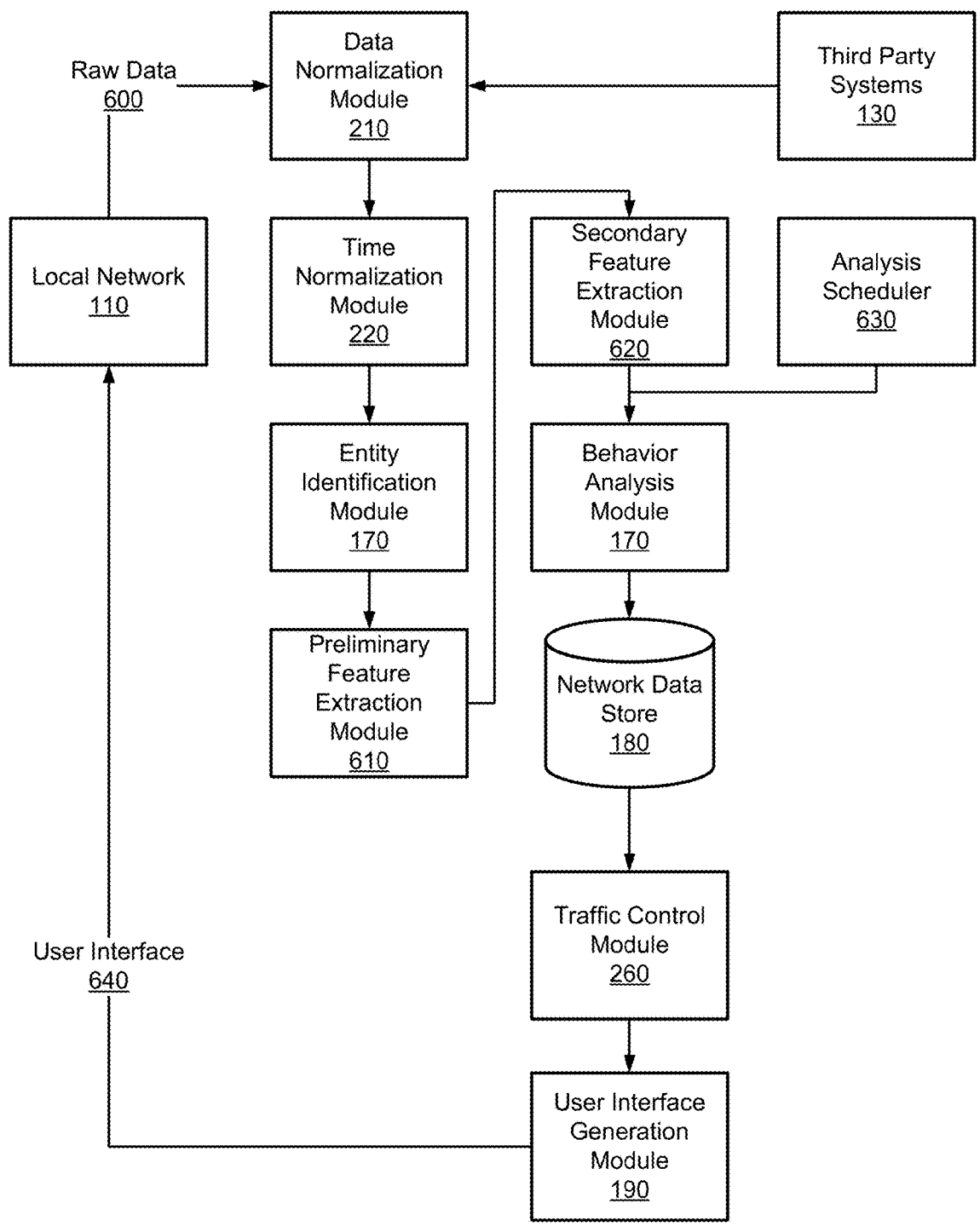
FIG. 6 illustrates data flow through the security analytics system, in accordance with some embodiments.

FIG. 6 illustrates data flow through the security analytics system, in accordance with some embodiments. The functionality of the modules in FIG. 6 can be performed by additional, fewer, or different modules and the functionality of the modules can be divvied between modules differently from how it is described below. The modules described below may perform similar functions to the modules described in FIGS. 1 and 2.

Raw data 600 is received from client devices in the local network 110. The raw data may be received by intercepting network communications associated with the client devices or may be sent directly by the client device. The data normalization module 210 receives the raw data 600 and data from third party systems 130 to generate structured data. The time normalization module 220 normalizes the timestamps in the structured data and transmits the time-normalized structured data to the entity identification module 170.

The entity identification module 170 establishes relationships between the entities described in the structured data and passes the structured data and the entity relationship information to the preliminary feature extraction module 610. The preliminary feature extraction module 610 performs simple computations on the structured data and the entity relationship information to generate a preliminary set of features. The preliminary set of features is sent to the secondary feature extraction module 620, which performs more sophisticated computations on the preliminary set of features to generate a secondary set of features. In some embodiments, the preliminary feature extraction module 610 and the secondary feature extraction module 620 perform similar functions to the feature extraction module 240 described in FIG. 2.

An analysis scheduler 630 schedules batch jobs for the behavior analysis module 170. In some embodiments, the analysis scheduler 630 ensures that models are updated on a regular basis. The behavior analysis module 170 receives the secondary set of features and analyzes the behavior of the entities in the local network 110. In some embodiments, the behavior analysis module 170 uses machine-learned models and pre-determined rules to generate threat scores representing the likelihood that an entity in the local network 110 is associated with a security threat.

The threat scores are transmitted to the traffic control module 260, which makes a determination for whether a security threat is present in the local network 110. The determination is sent to the user interface generate module 190, along with additional information describing the behavior of the entities in the local network 110. The user interface generation module 190 generates a user interface that describes the security threat and the additional information about the behavior of the entities, and sends the user interface 640 to the network administrator in the local network 110.

Entity Graph

Figure 7:
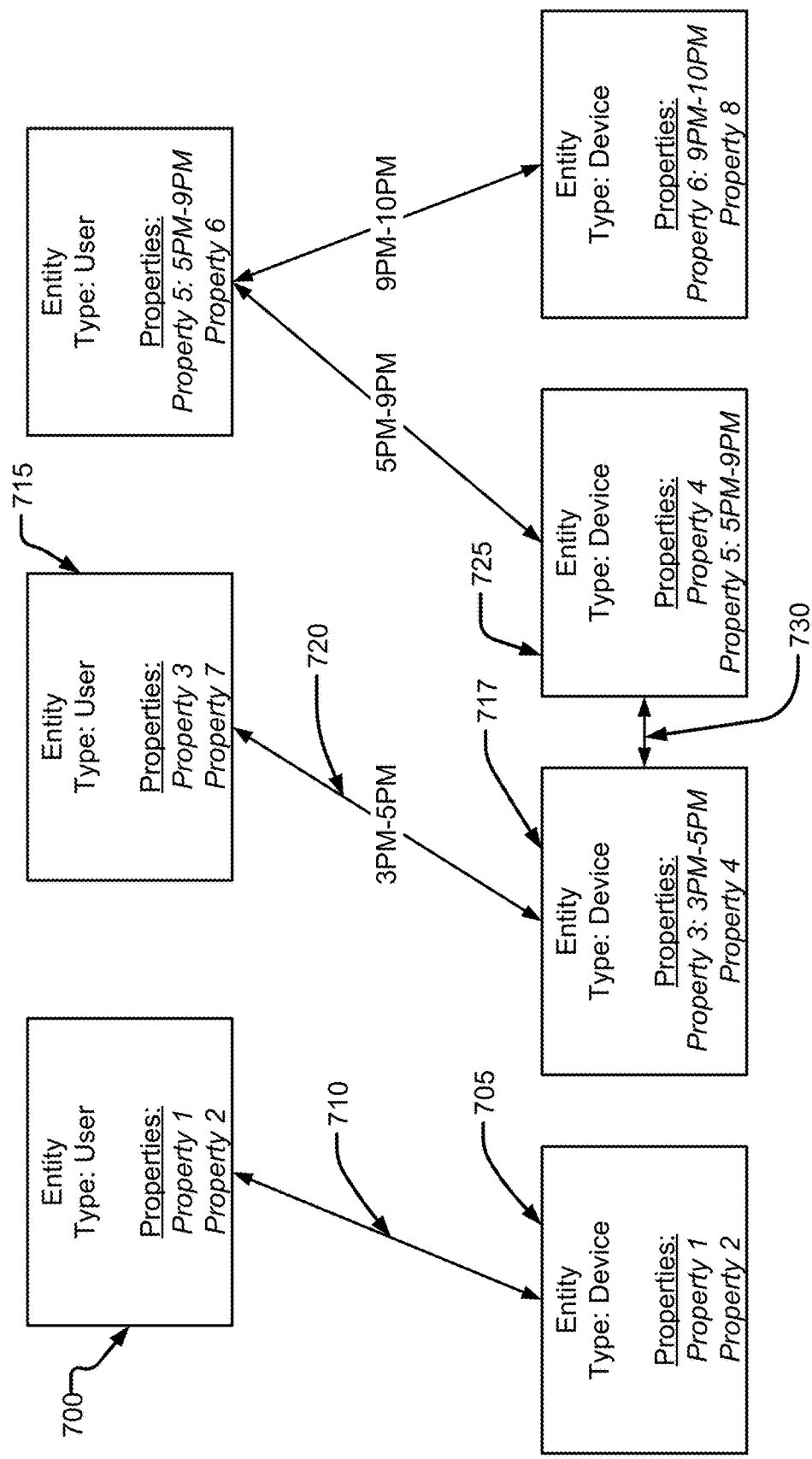
FIG. 7 illustrates an entity graph representing relationships between entities in a local network, in accordance with some embodiments.

FIG. 7 illustrates an entity graph representing relationships between entities in a local network, in accordance with some embodiments. Other embodiments may exist that do not perform exactly as illustrated in this figure and may contain additional, fewer, or different components than those illustrated.

As discussed above, an entity graph describes relationships between entities in the local network. Entity relationships can have different types, such as ownership relationships, and can exist only for certain time frames. By generating an entity graph that stores the relationships between the entities, the security analytics system can better detect security threats in the local network. In the embodiment shown, the entities are the nodes of the entity graph and the relationships are represented using the edges of the graph.

Referring now to FIG. 7, entity 700 is a user with entity properties 1 and 2. As described above, entity properties are characteristics about an entity that is discernable from data collected from the local network. For example, property 1 may be an IP address and property 2 may be a MAC address. Entity 705 is a device that also has properties 1 and 2 and, using this information, the security analytics system can establish an edge 710 between entity 700 and entity 705. In this example, entity 700 may use entity 705 as a workstation, so the security analytics system can attribute actions performed by entity 700 to entity 705 and vice versa.

Entity 715 is a user with entity properties 3 and 7. For example, property 3 may be a IP address and property 7 might be a username. Entity 717 is a device with entity properties 3 and 4. However, as noted in the figure, entity 717 was only associated with entity property 3 from 3 PM to 5 PM. Therefore, the security analytics system can establish a relationship 720 between entity 715 and entity 717. However, the edge 720 has a timeframe of 3 PM to 5 PM to designate that the relationship can only be determined within that timeframe.

Entity 725 is a device that has property 4, and has property 5 from 5 PM to 9 PM, where property 5 may be an IP address. Depending on the nature of property 4, it could be used to establish an edge 730 between entity 717 and entity 725. For example, property 4 could be information that designates the entity as a member of a group (e.g. a group ID or geographic information about where the entity is located) and, therefore, the edge 730 would designate entity 717 and entity 730 as members of a group of entities.

These relationships in the entity graph may be used to determine if a security threat is present in the local network. For example, if entity 705 is accessing a file that entity 700 should not be accessing and an edge has been established between entity 700 and entity 705 that associated the actions of entity 705 with entity 700, then it may be determined that entity 700 is exhibiting malicious behavior and is a security threat.

Example User Interface

Figure 8:
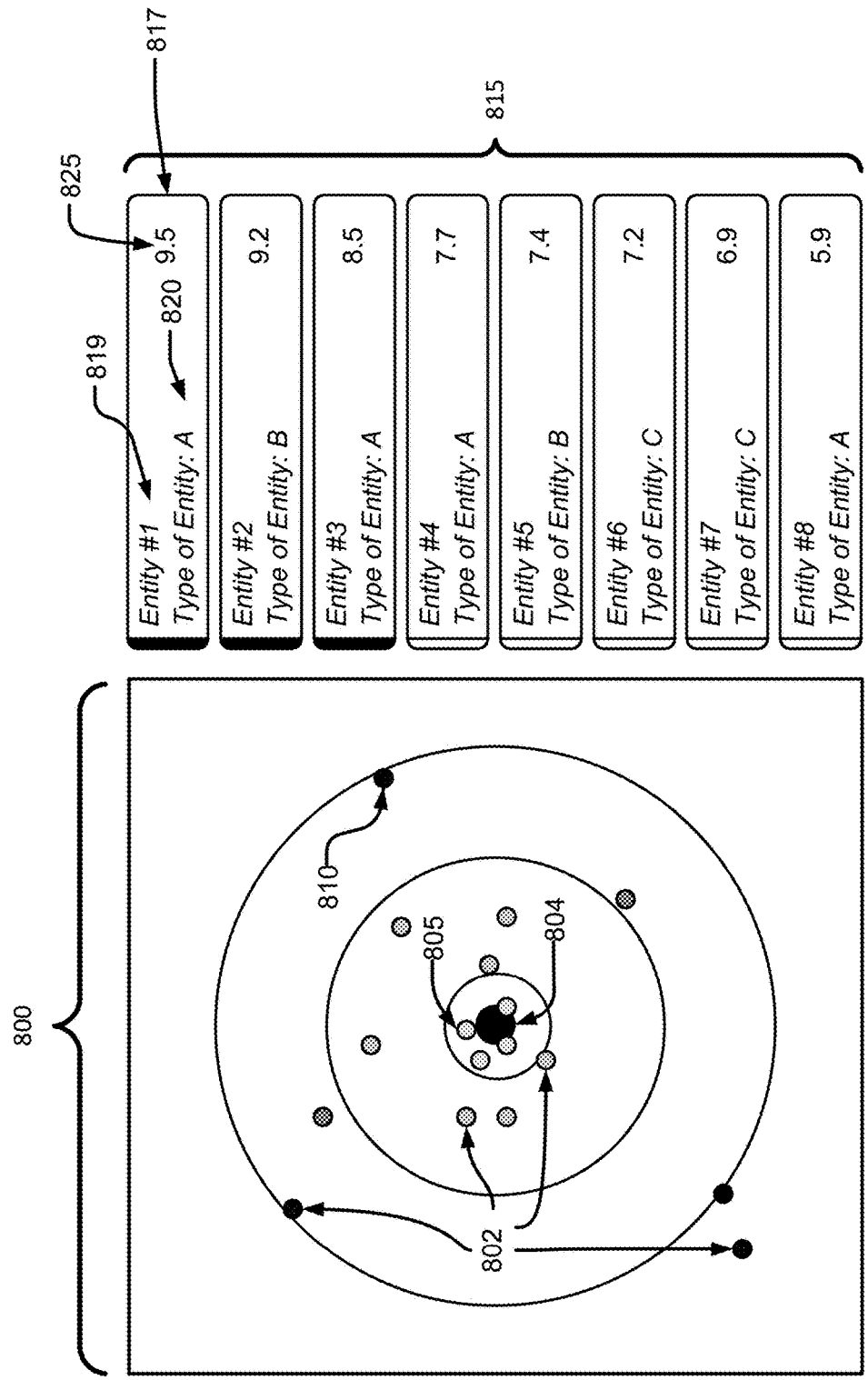
FIG. 8 illustrates a radial cluster plot displayed as a part of a user interface, in accordance with some embodiments.
Figure 9:
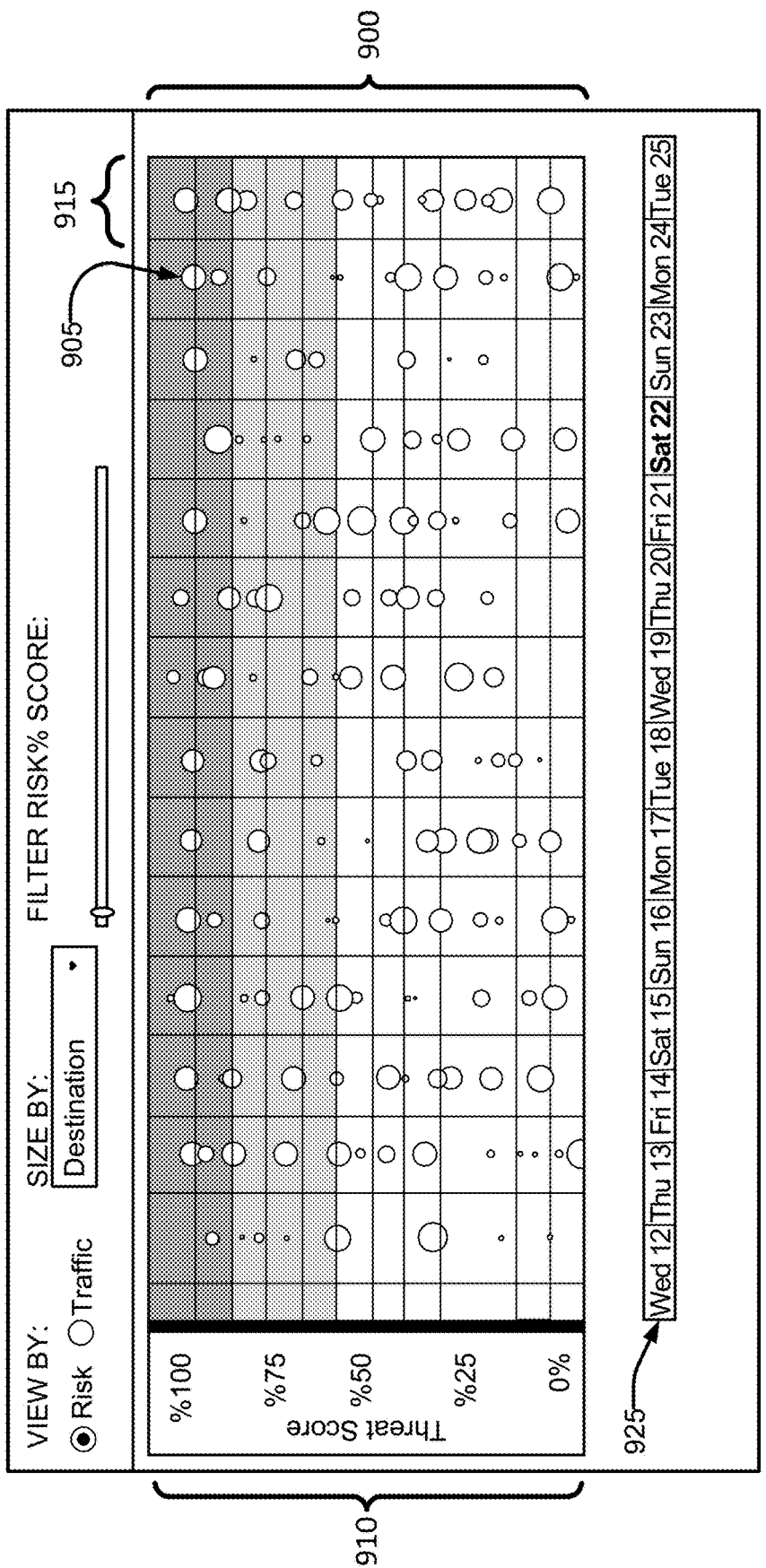
FIG. 9 illustrates an entity timeline displayed as a part of a user interface, in accordance with some embodiments.
Figure 10:
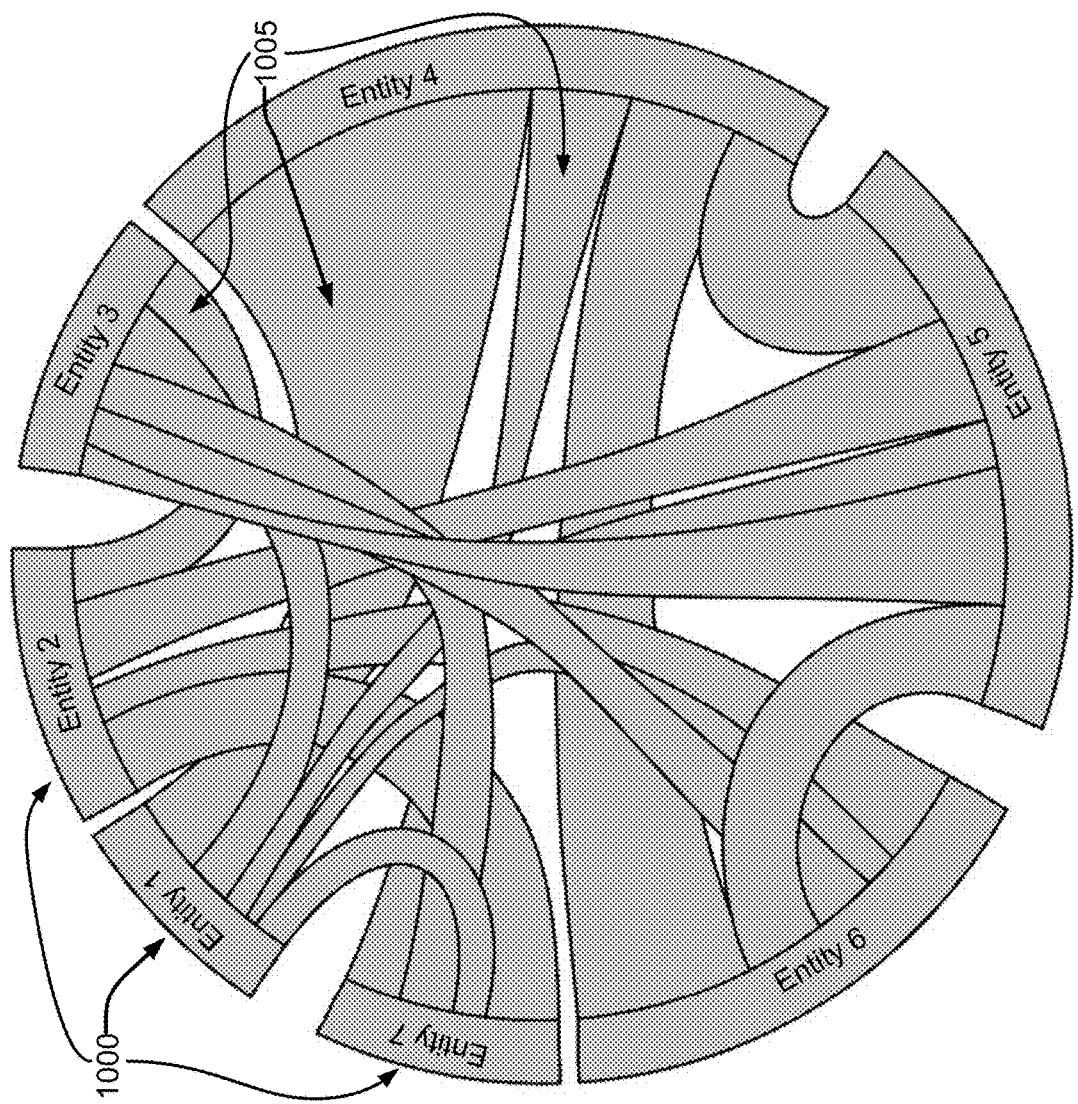
FIG. 10 illustrates an endpoint interaction chord diagram for entities within the local network as a part of a user interface, in accordance with some embodiments.

FIGS. 8-10 illustrate elements of a user interface that is provided by the security analytics system, in accordance with some embodiments. Other embodiments may exist that do not perform exactly as illustrated in these figures and may contain additional, fewer, or different components than those illustrated.

FIG. 8 illustrates a radial cluster plot displayed as a part of a user interface, in accordance with some embodiments. The radial cluster plot 800 can illustrate the threat scores of entities 802 within the local network. The distance from the entities 802 to the center 804 represents the magnitude of the threat score, wherein a greater distance from the center 804 represents a higher threat score (i.e. a greater likelihood that the entity 802 is associated with a security threat). For example, entity 805 is closer to the center 804 of the radial cluster plot 800 than entity 810, which represents the fact that entity 805 has a lower threat score than entity 810. In some embodiments, the radial position of the entity 802 in the radial cluster plot represents the similarity of entities 802 with other entities 802 at similar radial positions. For example, the radial cluster plot 800 may cluster user entities and device entities in different portions of the plot to distinguish between the types of entities.

The radial cluster plot 800 can also be displayed along with information 815 about each of the entities being plotted on the radial cluster plot 800. Cards 817 with information about each entity 802 can be displayed with information identifying the entity 819, the type of the entity 820 and the threat score associated with the entity 825. In some embodiments, a user can select an entity 802 on the radial cluster plot 800 to highlight the information card associated with the entity. In some embodiments, the user can select a card to display additional information about an entity 802 or to identify the entity on the radial cluster plot 800.

FIG. 9 illustrates an entity timeline, in accordance with some embodiments. The timeline 900 represents entities using icons 905. In some embodiments, the icons 905 represent a single entity. In other embodiments, the icons 905 represent groups of similar entities, wherein the size of icon 905 represents the number of entities in the group. The threat score of an entity is represented by the vertical position 910 of the icon 905 associated with the entity. In the embodiment illustrated in FIG. 9, the threat score is the likelihood that the entity is exhibiting malicious behavior. In some embodiments, the user can select an icon 905 to see more information about entity and the threat score for the entity.

The icons 905 are positioned with time periods 915, which represent the threat score of the entities associated with the icons 905 during the time period 915. In some embodiments, each time period represents a separate hour-long period within a day. In the embodiment illustrated in FIG. 9, the user can also select a date 920 for which the user would like to see a day-long timeline 900 of entity threat scores. For example, the user is presently seeing the threat scores for entities on Saturday, the $22^{nd}$ of the present month. In some embodiments, the user can select an icon 905 in the timeline, which highlights the icons 905 representing the same entity in the other time periods 910 being displayed. This allows the user to see how the threat score of an entity has changed over time.

FIG. 10 illustrates an endpoint interaction chord diagram for entities within the local network, in accordance with some embodiments. The chord diagram illustrates network traffic from endpoints, such as 1000. In the embodiment illustrated in FIG. 10, the endpoints 1000 are entities within the local network, however in other embodiments, the endpoints 1000 can be devices outside of the local network, groups of entities within the local network, or groups of devices outside of the local network. In some embodiments, the chord diagram includes information about each of the endpoints 1000, such as an IP address, a geographic location, and a domain. The chords 1005 represent network traffic that is communicated between the endpoints 1000 to which it is connected. The width of a chord 1005 represents the amount of network traffic that was communicated between the endpoints 1000. In some embodiments, the user can select a chord to see more details about the network traffic represented by the chord, such as the actual amount of traffic and when the traffic was sent.

Example Machine Architecture

Figure 11:
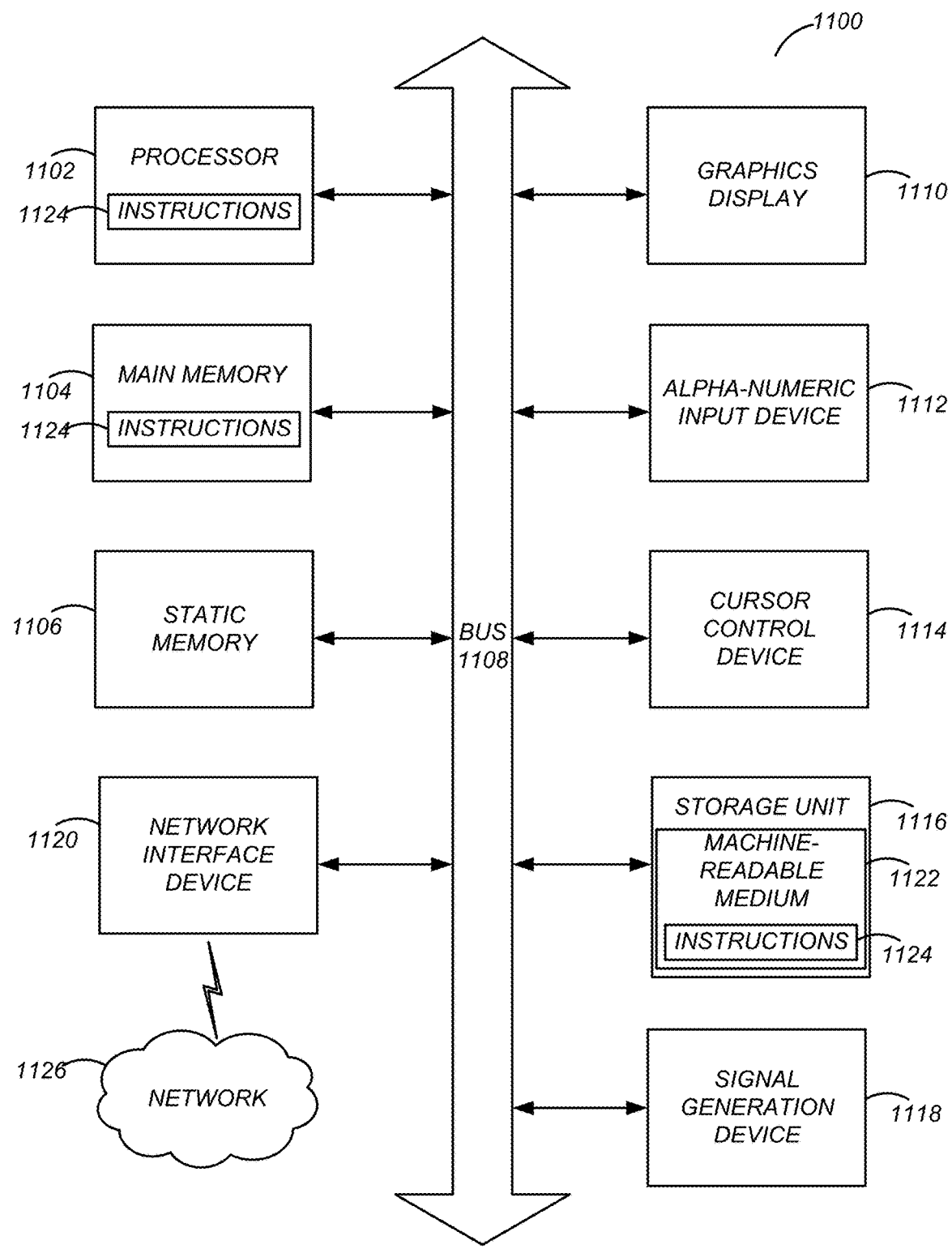
FIG. 11 is a block diagram illustrating components of an example machine able to read instructions from a machine-readable medium and execute them in a processor (or controller) to implement the system described herein, according to some embodiments.

FIG. 11 is a block diagram illustrating components of an example machine able to read instructions from a machine-readable medium and execute them in a processor (or controller). In some embodiments, all or some of the functionality of the above describe security analytics system may be executed by one or more of the example machine described here.

Specifically, FIG. 11 shows a diagrammatic representation of a machine in the example form of a computer system 1100. The computer system 1100 can be used to execute instructions 1124 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The example machine illustrated in FIG. 11 can represent the client devices 100 in the local network and the security analytics engine.

The machine may be a server computer, a client computer, a personal computer (PC), a tablet PC, a set-top box (STB), a smartphone, an internet of things (IoT) appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processing units (generally processor 1102). The processor 1102 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1100 also includes a main memory 1104. The computer system may include a storage unit 1116. The processor 1102, memory 1104 and the storage unit 1116 communicate via a bus 1108.

In addition, the computer system 1106 can include a static memory 1106, a display driver 1110 (e.g., to drive a plasma display panel (PDP), a liquid crystal display (LCD), or a projector). The computer system 1100 may also include alphanumeric input device 1112 (e.g., a keyboard), a cursor control device 1114 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium that is capable of storing instructions 1124 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The security analytics system as disclosed provides benefits and advantages that include detecting security threats within a local network even after the security threat has penetrated the security measures at the periphery of the local network. The security analytics system allows a cyber security analyst to identify and address security threats that are present in the local network by providing the network administrator with more detailed information about the behavior of entities in the local network. The security analytics system allows the behavior of an entity to be considered in the context of the local network as a whole and can use machine-learning techniques to adapt its detection techniques as security threats change. Additionally, the security analytics system can receive data from multiple local networks and use the context provided by the information from the local networks to make more informed determinations about the existence of security threats.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2A and 2B. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting security threats in a local network through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method comprising:
receiving, at a security analytics system, raw data describing a plurality of entities within a local network, the raw data comprising at least system log data and network traffic data, the plurality of entities comprising at least one user and at least one device in the local network;
parsing the raw data into a plurality of data fields, each data field comprising a type and a value;
identifying a subset of the plurality of data fields based on the relevance of the plurality of data fields for detecting a security threat in the local network;
generating filtered data from the raw data, the filtered data comprising the subset of the plurality of data fields;
generating structured data from the filtered data, the structured data being divided into portions that are each structured in accordance with a schema in a set of schema, each schema describing at least one data field of the subset of data fields from the filtered data;
identifying relationships between the plurality of entities in the local network based on the structured data, wherein identifying the relationships between the plurality of entities comprises: generating an entity graph describing the entity relationships, wherein nodes of the entity graph represent one or more of the plurality of entities, and edges in the graph represent relationships between the entities;

generating a set of features based on the set of structured data and the identified relationships between the plurality of entities in the local network;

generating one or more threat scores for one or more entities of the plurality of entities based on the set of features generated from the structured data and the identified relationships, wherein generating one or more threat scores for an entity comprises:

applying one or more machine-learned models to one or more features of the set of features; and generating a threat score from each machine-learned model output indicating a likelihood that the entity is performing malicious behavior;

determining malicious behavior exhibited by a particular entity of the plurality of entities based on the one or more threat scores satisfying a threshold; and in response to the determining, restricting access by the particular entity to data of the local network.

2. The method of claim 1, wherein generating a set of features of the raw data further comprises:

generating a preliminary set of features based on the set of structured data; and generating a secondary set of features based on the preliminary set of features and the structured data.

3. The method of claim 2, wherein the preliminary set of features comprise features that are generated using a first set of calculations performed on the structured data, and the secondary set of features comprise features that are generated using a second set of calculations performed on the first set of features, the second set of calculations being more sophisticated than the first set of calculations.

4. The method of claim 1, wherein parsing the raw data into a plurality of data fields comprises:

identifying key words within the raw data based on the relevance of the key words and key phrases to detecting a security threat in the local network;

identifying values associated with the key words in the raw data; and parsing the raw data based on the identified key words and the identified values.

5. The method of claim 1, wherein the raw data is parsed based on a pre-determined format for the raw data.

6. The method of claim 1, wherein identifying a subset of the plurality of data fields based on relevance comprises:

ranking the plurality of data fields based on a relevance of each data field of the plurality of data fields.

7. The method of claim 1, wherein each schema in the set of schema identifies a subset of related data fields of the plurality of data fields.

8. The method of claim 7, wherein each schema identifies data fields that are used to generate a threat score of the one or more threat scores.

9. The method of claim 1, wherein generating one or more threat scores comprises:

generating machine-learned models of the plurality of entities based on the set of structured data and identified relationships, wherein the machine-learned models are models of behaviors of the plurality of entities for detecting security threats in the local network;

applying one or more rules to the structured data to generate a plurality of threat scores; and combining the threat scores for an entity generated by the machine-learned models with the one or more threat scores generated by applying the one or more rules to determine an overall threat score for the entity.

10. The method of claim 1, wherein the user of the local network is a network administrator of the local network.

11. A computer program product comprising a non-transitory computer-readable storage medium configured to store executable computer code that, when executed by a processor, causes the processor to perform the steps of:

receiving, at a security analytics system, raw data describing a plurality of entities within a local network, the raw data comprising at least system log data and network traffic data, the plurality of entities comprising at least one user and at least one device in the local network;

parsing the raw data into a plurality of data fields, each data field comprising a type and a value;

identifying a subset of the plurality of data fields based on the relevance of the plurality of data fields for detecting a security threat in the local network;

generating filtered data from the raw data, the filtered data comprising the subset of the plurality of data fields;

generating structured data from the filtered data, the structured data being divided into portions that are each structured in accordance with a schema in a set of schema, each schema describing at least one data field of the subset of data fields from the filtered data;

identifying relationships between the plurality of entities in the local network based on the structured data, wherein identifying the relationships between the plurality of entities comprises: generating an entity graph describing the entity relationships, wherein nodes of the entity graph represent one or more of the plurality of entities, and edges in the graph represent relationships between the entities;

generating a set of features based on the set of structured data and the identified relationships between the plurality of entities in the local network;

generating one or more threat scores for one or more entities of the plurality of entities based on the set of features generated from the structured data and the identified relationships, wherein generating one or more threat scores for an entity comprises:

applying one or more machine-learned models to one or more features of the set of features; and generating a threat score from each machine-learned model output indicating a likelihood that the entity is performing malicious behavior;

determining malicious behavior exhibited by a particular entity of the plurality of entities based on the one or more threat scores satisfying a threshold; and in response to the determining, restricting access by the particular entity to data of the local network.

12. The computer program product of claim 11, wherein the step of generating a set of features of the raw data further comprises:

generating a preliminary set of features based on the set of structured data; and generating a secondary set of features based on the preliminary set of features and the structured data.

13. The computer program product of claim 11, wherein the step of parsing the raw data into a plurality of data fields comprises:

identifying key words within the raw data based on the relevance of the key words and key phrases to detecting a security threat in the local network;

identifying values associated with the key words in the raw data; and parsing the raw data based on the identified key words and the identified values.

14. The computer program product of claim 11, wherein the raw data is parsed based on a pre-determined format for the raw data.

15. The computer program product of claim 11, wherein the step of identifying a subset of the plurality of data fields based on relevance comprises:

ranking the plurality of data fields based on a relevance of each data field of the plurality of data fields.

16. The computer program product of claim 11, wherein each schema in the set of schema identifies a subset of related data fields of the plurality of data fields.

17. The computer program product of claim 11, wherein each schema identifies data fields that are used to generate a threat score of the one or more threat scores.

18. The computer program product of claim 11, wherein the step of generating one or more threat scores comprises:

generating machine-learned models of the plurality of entities based on the set of structured data and identified relationships, wherein the machine-learned models are models of behaviors of the plurality of entities for detecting security threats in the local network;

applying one or more rules to the structured data to generate a plurality of threat scores; and combining the threat scores for an entity generated by the machine-learned models with the one or more threat scores generated by applying the one or more rules to determine an overall threat score for the entity.

19. A system comprising:

one or more processors and one or more computer-readable storage medium configured to store executable computer code that, when executed by the one or more processors, causes the one or more processors to perform operations comprising:

receiving, at a security analytics system, raw data describing a plurality of entities within a local network, the raw data comprising at least system log data and network traffic data, the plurality of entities comprising at least one user and at least one device in the local network;

parsing the raw data into a plurality of data fields, each data field comprising a type and a value;

identifying a subset of the plurality of data fields based on the relevance of the plurality of data fields for detecting a security threat in the local network;

generating filtered data from the raw data, the filtered data comprising the subset of the plurality of data fields;

generating structured data from the filtered data, the structured data being divided into portions that are each structured in accordance with a schema in a set of schema, each schema describing at least one data field of the subset of data fields from the filtered data;

identifying relationships between the plurality of entities in the local network based on the structured data, wherein identifying the relationships between the plurality of entities comprises: generating an entity graph describing the entity relationships, wherein nodes of the entity graph represent one or more of the plurality of entities, and edges in the graph represent relationships between the entities;

generating a set of features based on the set of structured data and the identified relationships between the plurality of entities in the local network;

generating one or more threat scores for one or more entities of the plurality of entities based on the set of features generated from the structured data and the identified relationships, wherein generating one or more threat scores for an entity comprises:

applying one or more machine-learned models to one or more features of the set of features; and generating a threat score from each machine-learned model output indicating a likelihood that the entity is performing malicious behavior;

determining malicious behavior exhibited by a particular entity of the plurality of entities based on the one or more threat scores satisfying a threshold; and in response to the determining, restricting access by the particular entity to data of the local network.

20. The system of claim 19, wherein generating a set of features of the raw data further comprises:

generating a preliminary set of features based on the set of structured data; and generating a secondary set of features based on the preliminary set of features and the structured data.

21. The system of claim 20, wherein the preliminary set of features comprise features that are generated using a first set of calculations performed on the structured data, and the secondary set of features comprise features that are generated using a second set of calculations performed on the first set of features, the second set of calculations being more sophisticated than the first set of calculations.

22. The system of claim 19, wherein parsing the raw data into a plurality of data fields comprises:

identifying key words within the raw data based on the relevance of the key words and key phrases to detecting a security threat in the local network;

identifying values associated with the key words in the raw data; and parsing the raw data based on the identified key words and the identified values.

23. The system of claim 19, wherein identifying a subset of the plurality of data fields based on relevance comprises:

ranking the plurality of data fields based on a relevance of each data field of the plurality of data fields.

24. The system of claim 19, wherein generating the one or more threat scores comprises:

applying one or more rules to the structured data to generate a plurality of threat scores; and combining the threat scores for an entity generated by the machine-learned models with the one or more threat scores generated by applying the one or more rules to determine an overall threat score for the entity.

* * * * *